T. E. MURRAY.
METER TESTING CUT-OUT.
APPLICATION FILED DEC. 5, 1912.
1,219,132.
Patented Mar. 13, 1917.
2 SHEETS—SHEET 1.
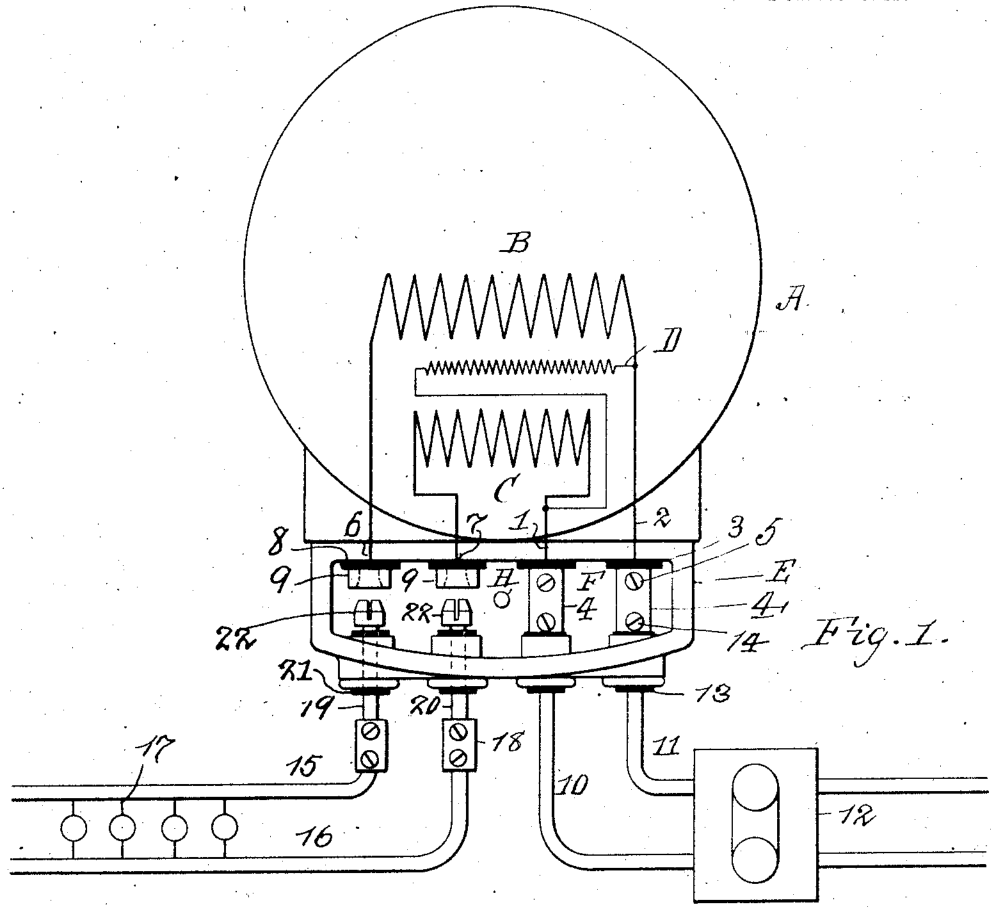
Witnesses:
Gertrude A. Porter
May T. McGarry.
Inventor
Thomas E. Murray
By his Attorney
Park Benjamin

T. E. MURRAY.

METER TESTING CUT-OUT.

APPLICATION FILED DEC. 5, 1912.

1,219,132.

Patented Mar. 13, 1917.

2 SHEETS—SHEET 2.

Witnesses:
Gertrude T. Porter
May T. McGarry.

Inventor
Thomas E. Murray
By his Attorney
Park Benjamin

UNITED STATES PATENT OFFICE.

THOMAS E. MURRAY, OF NEW YORK, N. Y.

METER-TESTING CUT-OUT.

1,219,132. Specification of Letters Patent. Patented Mar. 13, 1917.

Application filed December 5, 1912. Serial No. 735,051.

*To all whom it may concern:*

Be it known that I, THOMAS E. MURRAY, a citizen of the United States, residing at New York, in the county of New York and State of New York, have invented a certain new and useful Improvement in Meter-Testing Cut-Outs, of which the following is a specification.

The invention relates to meter testing cut-outs, and consists in the construction hereinafter set forth, whereby the testing devices may be applied to meter terminals disposed on the exterior of the meter case.

In the accompanying drawings—

Figure 4:
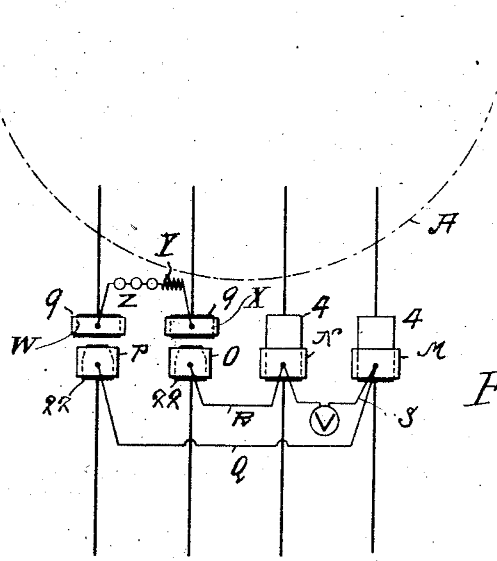
Figure 5:
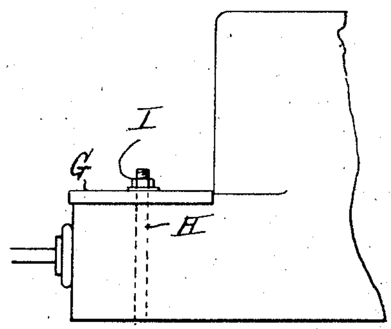

Figure 1 is a front view of the device with the cover plate removed. Figs. 2 and 3 show respectively and in perspective the two gang plugs. Fig. 4 illustrates diagrammatically the position of the parts when the two gang plugs shown in Figs. 2 and 3 are in place. Fig. 5 is a side view of a part of the meter casing showing the cover in place.

Similar numbers and letters of reference indicate like parts.

A is the meter casing, B and C are the field coils, and D is the potential coil. On the meter casing and preferably integral therewith is a box E, having an opening F which is closed by the cover plate G, Fig. 5. Extending upward from the rear wall of the box E is a fixed bolt H which passes through the opening in the cover G when the same is in place, and receives a fastening nut I. Two of the meter field coil terminals, namely 1 and 2, pass through insulating bushings 3 in the wall of box E, and are secured in metal tubes 4 by screws 5. The other two terminals 6 and 7 of the field coils pass through similar insulating bushings 8 and are secured to metal sockets 9. The tubes and sockets 9 are insulated respectively by the bushings 3 and 8 from the metal of the casing A.

The service leads 10 and 11 have interposed in them the usual fuse plug 12, and after passing through insulating bushings 13 are connected to the tubes 4 by screws 14. The service leads 15 and 16 are connected to the load 17 and are fastened at their ends in metal blocks 18. On said blocks 18, are rods 19, 20, which extend through insulating bushings 21 into the box E and terminate in split-heads 22. Said heads taper toward their extremities to enter the similarly shaped cavities of the sockets 9. Under ordinary conditions the rods 19, 20 are slid inwardly through their bushings until the heads 22 enter the sockets 9 when circuit becomes established from the service leads through the meter to the load in the usual way.

When it is desired to break circuit between the service leads and the meter, the rods 19, 20 are slid outwardly in their bushings to withdraw the heads 22 from the sockets 9, as shown in Fig. 1. This, of course, may be done while the cover G of box E is in place. When it is desired to test the meter the cover G is removed and the gang plugs shown in Figs. 2 and 3 are put in position as follows:

The gang plug J, Fig. 2, has a support K of insulating material, provided with a handle L. On the under side of said plug are four pairs of contacts, M, N, O, P. The pairs M, P, are connected by the conductor Q. The pairs N, O, are connected by the conductor R. The pairs M, N, are connected by a conductor S, in which is interposed a voltmeter V. The gang plug T, Fig. 3, has a support of insulating material U, from which depend two pairs of contacts W, X. Said contacts are connected to the ammeter Y and artificial load Z.

The rods 19 and 20 are drawn outwardly so as to remove the split-heads 22 from the sockets 9, as shown in Fig. 1. The gang plug J is put in position as shown in Fig. 4; that is with the pairs of contacts O, P, coöperating with the heads 22, and the contacts M, N, coöperating with the metal tubes 4 which here serve as contact blocks. The gang plug T is placed with its pairs of contacts W, X, respectively, upon the metal sockets 9. In this way direct connection is established from the service leads 10, 11, through the conductors R, Q, to the load leads 15, 16. The voltmeter is connected across the line, and the ammeter and artificial load is connected in series with the field coils of the meter. After the test readings are taken the gang plugs are removed, cover replaced, and the heads 22 reinserted in the sockets 9 to restore the running conditions.

Particular attention is called to the fact that the sockets 9 and the movable heads 22 are completely inclosed in the box E which, as stated, may be made integral with the meter casing, and that the heads by means of the rods 19, 20, are operated from outside of said box. All of the terminals whereby the meter is connected to the leads are completely shielded, whether said terminals be fixed or movable.

I claim:

1. In combination with the field coils of an electric meter, and an inclosing case therefor, contact blocks outside of said case respectively connected to two terminals of said field coils, line conductors connected to said blocks, tubular sockets on the exterior of said case connected to the remaining field coil terminals, rods slidably supported in front of said sockets, load conductors connected to said rods, heads on said rods fitting said sockets, a gang plug having contacts coöperating with said contact blocks and said heads, connections on said plug and between the contacts thereof for cutting the field coils out of line circuit, and a voltmeter connection across the line, a second gang plug having contacts coöperating with said sockets, and an ammeter connection on said second plug and between said plug contacts.

2. In combination with the field coils of an electric meter, and a case having two compartments, one of said compartments inclosing said coils, contact blocks secured in said second compartment, insulated from the walls thereof and connected to two terminals of said field coils, line conductors connected to said blocks, tubular sockets in said second compartment, supported on a wall thereof and connected to the remaining field coil terminals, rods slidably supported in the opposite wall of said second compartment, load conductors connected to said rods, heads on said rods fitting said sockets, a gang plug having contacts coöperating with said contact blocks and said heads, connections on said plug and between the contacts thereof for cutting the field coils out of line circuit, and a voltmeter connection across the line, a second gang plug having contacts coöperating with said sockets, and an ammeter connection on said second plug and between said plug contacts.

In testimony whereof I have affixed my signature in presence of two witnesses.

THOMAS E. MURRAY.

Witnesses:

GERTRUDE T. PORTER,
MAY T. MCGARRY.